(12) United States Patent
Liu et al.

(10) Patent No.: US 9,158,603 B2
(45) Date of Patent: Oct. 13, 2015

(54) MESSAGE PROCESSING METHOD AND DEVICE

(71) Applicant: BEIJING QIHOO TECHNOLOGY COMPANY LIMITED, Xicheng, Beijing (CN)

(72) Inventors: Hongwei Liu, Beijing (CN); Xi Tang, Beijing (CN); Peng Sun, Beijing (CN); Huan Ren, Beijing (CN)

(73) Assignee: BEIJING QIHOO TECHNOLOGY COMPANY LIMITED (CN)

( * ) Notice: Subject to any disclaimer, the term of this patent is extended or adjusted under 35 U.S.C. 154(b) by 0 days.

(21) Appl. No.: 14/368,162

(22) PCT Filed: Dec. 24, 2012

(86) PCT No.: PCT/CN2012/087262
§ 371 (c)(1),
(2) Date: Jun. 23, 2014

(87) PCT Pub. No.: WO2013/097663
PCT Pub. Date: Jul. 4, 2013

(65) Prior Publication Data
US 2015/0012923 A1  Jan. 8, 2015

(30) Foreign Application Priority Data
Dec. 28, 2011  (CN) .......................... 2011 1 0448569
Dec. 28, 2011  (CN) .......................... 2011 1 0448844

(51) Int. Cl.
*G06F 13/00*  (2006.01)
*G06F 9/54*  (2006.01)

(52) U.S. Cl.
CPC .......... *G06F 9/546* (2013.01); *G06F 2209/548* (2013.01)

(58) Field of Classification Search
CPC ...................................................... G06F 9/546
USPC .................................................. 719/313, 314
See application file for complete search history.

(56) References Cited

U.S. PATENT DOCUMENTS 6,704,800 B1    3/2004  Lee et al.
2010/0142696 A1*  6/2010  Zhou et al. ............... 379/215.01
(Continued)

FOREIGN PATENT DOCUMENTS

WO       2011001210 A1    1/2011

OTHER PUBLICATIONS

English translation of Abstract only of Chinese Application No. CN101408851A, Publication date Apr. 15, 2009, country: China, Inventors: Xiaojun Chang, Title: System and Method for Emergently Stopping Application Program, one page.
(Continued)

*Primary Examiner* — Andy Ho
(74) *Attorney, Agent, or Firm* — Polsinelli PC

(57) ABSTRACT

The present invention provides a message processing method and device, wherein the method comprises: creating a message queue by an application; taking out all current messages from a message queue created by an operating system; performing order adjustment for the taken-out messages and placing them in the message queue created by the application; performing delivery-processing for each message according to an order of messages in the message queue created by the application. Through the present invention, the messages in the message queue may be processed more flexibly.

15 Claims, 3 Drawing Sheets

(56) References Cited

U.S. PATENT DOCUMENTS

2010/0175010 A1* 7/2010 Jeyabalan et al. ............ 715/769
2010/0229182 A1* 9/2010 Ito et al. ........................ 719/314

OTHER PUBLICATIONS

English translation of Abstract only of Chinese Application No. CN101996099A, Publication date Jul. 4, 2012, country: China, Inventors: Duanhong Luo, Title: Method and system for processing information, one page.

English translation of Abstract only of Chinese Application No. CN102541641A, Publication date Mar. 30, 2011, country: China, Inventors: Hongwei Liu, et al, Title: Method and Device for Browser Message Processing, one page.

English translation of Abstract only of Chinese Application No. CN102591658A, Publication date Jul. 18, 2012, country: China, Inventors: Xi Tang, et al, Title: Method and Device for Processing Message, one page.

International Search Report regarding PCT/CN2012/087262 issued Mar. 28, 2013, 4 pages.

* cited by examiner

MESSAGE PROCESSING METHOD AND DEVICE

FIELD OF THE INVENTION

The present invention relates to the technical field of Windows message processing, and particularly to a message processing method and device.

BACKGROUND OF THE INVENTION

Windows operating system is a message driving system. Windows' messages provide a means for communication between applications, and between applications and a Windows operating system. A function to be achieved by applications is triggered by a message and completed by virtue of response to and processing of the message.

All input apparatuses of a computer are collectively monitored by the Windows. When an event happens, the Windows first places the inputted messages in a system message queue, and then copies the message to a thread message queue corresponding to the application. A message processing program of the application will detect the message queue repeatedly, converts the detected message, and then delivers it to a corresponding window function, and the corresponding window function performs processing of the message. This is a necessary procedure for an event from occurring to arriving at a window function and being processed.

However, in the Windows operating system, messages are not preemptive, i.e., regardless of degree of urgency of events, the events are always processed in turn in the sequential order of arrival (except for some system messages), which might cause some disadvantageous influences. For example, it is possible that some real-time external events are not processed in a timely manner, which affects achievement of specific functions by the application. For example, as far as a browser is concerned, the application is a webpage browsing tool which needs to interact with the user frequently. After the user triggers some external events, some operations might be caused to invalidate if the events cannot be processed for a long time. In another case, some messages that arrive later must be processed before some other messages that arrive earlier, to achieve a predetermined effect. Apparently, this case becomes impossible if the mechanism of first arriving first processed is still employed.

Therefore, a technical problem to be solved urgently by those skilled in the art is how to process the browser messages more flexibly to better achieve the browser functions.

SUMMARY OF THE INVENTION

In view of the above problems, the present invention is proposed to provide a message processing method and device and a browser message processing method and device, which can overcome the above problems or at least partially solve or ease the above problems.

According to an aspect of the present invention, there is provided a message processing method, comprising: creating a message queue by an application; taking out all current messages from a message queue created by an operating system; performing order adjustment for the taken-out messages and placing them in the message queue created by the application; performing delivery-processing for each message according to an order of messages in the message queue created by the application.

According to another aspect of the present invention, there is provided a message processing device, comprising: a queue creating unit configured to create a message queue by the application; a message taking-out unit configured to take out all current messages from the message queue created by the operating system and delete the taken-out messages from the message queue created by the operating system; an order adjusting unit configured to perform order adjustment for the taken-out messages and place them in the message queue created by the application; a message delivery unit configured to perform delivery-processing for each message according to an order of messages in the message queue created by the application.

According to an aspect of the present invention, there is provided a browser message processing method, comprising: creating a message queue by the application; taking out all current messages from the message queue created by an operating system for a browser thread, and placing them in the message queue created by the application; judging whether messages complying with preset conditions exist in the taken-out messages, and if existence, and performing order adjustment for the messages complying with the preset conditions; delivering each message to a corresponding window of the browser for processing according to an order of messages in the message queue created by the application.

According to another aspect of the present invention, there is provided a message processing device, comprising: a queue creating unit configured to create a message queue by the application; a message taking-out unit configured to take out all current messages from the message queue created by the operating system for the browser thread and place them in the message queue created by the application; an order adjusting unit configured to judge whether messages complying with preset conditions exist in the taken-out messages, and if existence, perform order adjustment for the messages complying with the preset conditions; a message delivery unit configured to deliver each message to a corresponding window of the browser for processing according to the order of messages in the message queue created by the application.

According to a yet another aspect of the present invention, there is provided a computer program which comprises a computer readable code; when the computer readable code is run on a server, the server executes the method according to any one of claims 1-5 and 11-15.

The advantageous effects of the present invention are as follows:

adopting the technical solution of the present invention allows for adjustment of the sequential execution order of message, not uniformly abiding by the principle in a sequential order of arrival as specified in the operating system. As such, the messages in the message queue may be processed more flexibly. For example, some real-time external events may be processed in a timely manner, and if there occurs a situation some messages that arrive later must be processed before some other messages that arrive earlier to achieve a predetermined effect, the messages that arrive later may be adjusted to before the messages that arrive earlier to achieve the predetermined effect.

The above description only generalizes technical solutions of the present invention. The present invention may be implemented according to the content of the description in order to make technical means of the present invention more apparent. Specific embodiments of the present invention are exemplified below to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments, not to limit the present invention. In all figures, the same reference number denotes the same part. In the figures.

DETAILED DESCRIPTION OF THE INVENTION

The present invention will be further described below with reference to figures and specific embodiments.

Figure 1:
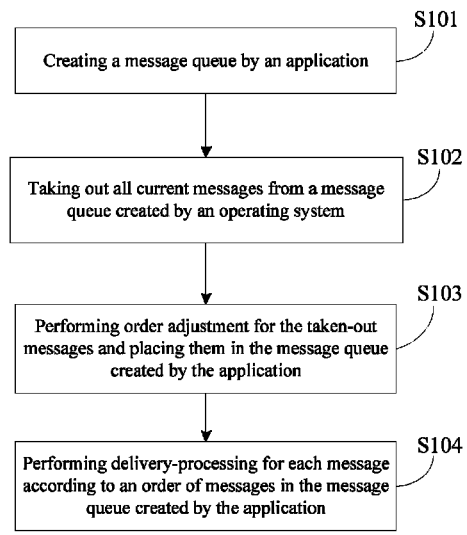
FIG. 1 illustrates a flow chart of a message processing method according to an embodiment of the present invention.

Referring to FIG. 1, an embodiment of the present invention first provides a message processing method which may be applied to one application (the application may be an application developed for performing the message processing function, or result from adding the message processing function on the basis of already-existing other applications). Upon specific implementation, the method may comprise the following steps:

S101: creating a message queue by the application;

The message queue is created by the application itself. Hence, the application may decide, on its own, an arranging order of the messages in the queue, or adjust the order on its own.

S102: taking out all current messages from the message queue created by the operating system;

To make the step apparent, the message processing procedure in the operating system is introduced briefly. Generally, one message (an externally-inputted message is taken as an example) undergoes the following procedure from generation to final processing: (1) when a mouse or keyboard acts, a device drive converts an input operations into a message and places it in a system message queue; (2) when the operating system moves a message out of the system message queue every time, it judges which target window the message belongs to, and then delivers it to a message queue of a thread creating the target window, i.e., the message queue of the thread receives all mouse and keyboard messages for the window created by it; (3) the thread moves messages out of its message queue and guides the system to deliver these messages to a correct window for processing. As can be seen from the above, the operating system create two kinds of message queues: one is the system message queue into which all messages are placed first; the other is the message queue of the thread into which all messages to be processed by the window created by a certain thread are placed.

In embodiments of the present invention, it is feasible to take out all current messages from the aforesaid system message queue, or take out all current messages from the message queue of a specific thread. Nevertheless, in actual application, it is possible that not all messages call for order adjustment, and only those messages in interface-related treads have such demand. Therefore, in a preferred embodiment, all current messages may be taken out only from message queues of some designated threads; or alternatively, whether all current threads are related to the interface may be judged first, and if they are related, the messages in the message queue thereof may be taken out; otherwise, the order judgment may not be performed for the messages in the message queue thereof. Of course, it is also feasible to determine adjustment of messages from which tread message queues according to actual needs.

It needs to be noted that, the messages in the message queue created by the operating system might comprise, besides the aforesaid externally-inputted messages (namely, messages generated by the mouse, keyboard or the like), system messages (namely, messages generated by the operating system) and messages generated by programs running on the operating system, for example, a certain operation might not be processed immediately, whereupon the processing may be postponed by generating a message; or some operations might need to be executed in a trans-thread manner, whereupon they may be placed in the message queue first, and then delivered to the corresponding thread message queue; and so on. In the embodiment of the present invention, when the current messages are taken out from the message queue created by the operating system, the messages may comprise all of the aforesaid kinds of messages, namely, all messages, no matter whether the externally-inputted messages or messages of the operating system or messages generated by programs running on the system may be taken out and placed in the message queues created by them on their own to facilitate adjustment of the order. Of course, the adjustment of the execution orders of some system messages might not be permitted, whereupon order adjustment may not be performed for such system messages.

In addition, it needs to be noted that, the messages may be taken out from the system-created message queue by using API (Application Programming Interface) functions provided by the system. For example, if the messages are taken out from the message queue of the designated thread, the API function PeekMessage may be directly used; if the messages are taken out from the system message queue, all messages may be directly obtained by message hook technology or at a driving layer, which will not be described in details here. Of course, to avoid occurrence of errors during program running, after the current messages are taken out from the operating system-created message queue, the taken-out messages may be deleted from the operating system-created message queue.

S103: performing order adjustment for the taken-out messages and placing them in the application-created message queue;

The messages taken out from the operating system-created message queue may be placed in the message queue of the application, and the order of the messages can be adjusted while placing them in the message queue. Of course, it is also feasible to adjust the order of messages after placing them into the message queue. A basis for adjusting the messages may be specifically determined according to needs in practical application, for example, it may be believed that some messages generated by operations related to user interaction need to be priority-processed, whereupon such messages may be placed at a relatively forward position in the message queue. Again for example, suppose that the user is viewing a video, an operation related to the video might need to be priority-processed, whereupon the message corresponding to such operation may be placed at a relatively forward position in the message queue. Again for example, if the user performs other operations upon viewing the video, it may be believed that the message corresponding to such operation of the user needs to jump the queue and be processed in advance.

It needs to be noted that, the operating system numbers each message so that each message has its own ID, and a message may include information such as window handle, message type, and so on. These information may be acquired through API functions of the system (for example, whether there is keyboard or mouse information is in the thread message queue may be checked through GetInputState, and a certain type of message in the message queue may be checked through GetQueueStatus), the window for processing each message and the operation corresponding to the message can be known from these information, and thereby the order of each message in the message queue can be determined according to preset rules. For example, if it is found that the operation corresponding to a certain message taken out needs to be processed by a certain video play window and a priority level preset for such type of message is relatively high, the message may be placed at a relatively forward position in the message queue, even at the first position, and so on.

S104: performing delivery-processing for each message according to the order of messages in the message queue created by the application.

Since each message has already been re-adjusted in the message queue created by the application on its own, delivery-processing may be performed for each message according to the order after adjustment. Specifically, if the message is taken out from the message queue of the designated thread in step S102, upon delivery-processing the message may be directly delivered to the corresponding window which processes the message. That is to say, in this case, after the messages in the system queue are delivered by the operating system to a specific thread message queue, it is not the thread that delivers the messages to a specific window, but an application having the message processing function as stated in the embodiment of the present invention, in place of the specific thread, that completes the delivery. Upon specific implementation, the application having the message processing function, in place of the specific thread, may complete the message delivery operation by using API functions provided by the operating system (an API function may be DispatchMessage).

In addition, if the messages are taken out from the system message queue in step S102, upon delivering, the message may be first delivered to the message queue of the thread creating the window, subsequent operation may be completed by the thread on its own, that is, the thread delivers the messages in its own message queue to a corresponding window, and then the corresponding window processes the message. In other words, in this case, before the operating system delivers the messages in the system queue to the specific thread message queue, the application having the message processing function as stated in the embodiment of the present invention performs sorting processing for the messages, and then the application delivers the sorted messages to the message queues of respective threads. As such, it is still the thread that delivers the message to the specific window, but it is the application having the message processing function as stated in the embodiment of the present invention in place of the operating system that delivers each message to the message queue of each thread.

To sum up, by using the message processing method provided by the embodiment of the present invention, the application may create the message queue on its own, and current messages may be taken out from the message queue created by the operating system, and placed in the application-created message queue, so that the execution order of the messages may be adjusted, not uniformly abiding by the principle of first arriving first processed as specified in the operating system. As such, the messages in the message queues may be processed more flexibly. For example, some real-time external events may be processed in a timely manner, and if there occurs a situation some messages that arrive later must be processed before some other messages that arrive earlier to achieve a predetermined effect, the messages that arrive later may be adjusted to before the messages that arrive earlier to achieve the predetermined effect, etc.

Figure 2:
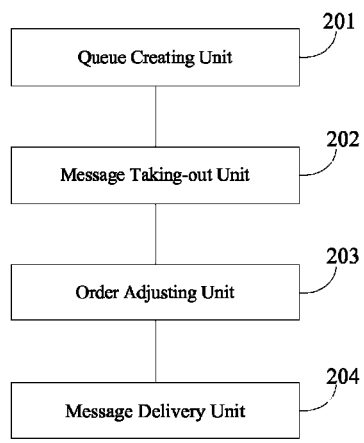
FIG. 2 illustrates a schematic view of a message processing device according to an embodiment of the present invention.

Corresponding to the message processing method provided by the embodiment of the present invention, embodiments of the present invention further provide a message processing device, which is also applied to an application. Referring to FIG. 2, the device comprises the following units:

a queue creating unit 201 configured to create a message queue by the application;

a message taking-out unit 202 configured to take out all current messages from the message queue created by the operating system;

an order adjusting unit 203 configured to perform order adjustment for the taken-out messages and placing them in the application-created message queue;

a message delivery unit 204 configured to perform delivery-processing for each message according to the order of messages in the message queue created by the application.

Of course, to avoid occurrence of errors during program running, after the current messages are taken out from the operating system-created message queue, the taken-out messages may be deleted from the operating system-created message queue. Upon specific implementation, the device may further comprise:

a deleting unit configured to, after all current messages are taken out from the operating system-created message queue, delete the taken-out messages from the operating system-created message queue.

Therein, upon specific implementation, the message taking-out unit 202 may comprise:

a first taking-out subunit configured to take out all current messages from the message queue created by the operating system for the designated thread;

correspondingly, the message delivery unit 204 may comprise:

a first delivery subunit configured to deliver messages to corresponding windows so that the corresponding windows process their respective messages. In this manner, the designated thread may be a thread related to an interface, and certainly may be other threads needed in practical application.

Or alternatively, in another implementation mode, the message taking-out unit 202 may also comprise:

a second taking-out subunit configured to take out all current messages from the system message queue created by the operating system;

correspondingly, the message delivery unit 204 may comprise:

a second delivery subunit configured to deliver all messages to the message queue created by the operating system for a corresponding thread so that the corresponding thread delivers the messages to a corresponding window for processing.

By using the message processing device provided by the embodiment of the present invention, the application may create the message queue on its own, and current messages may be taken out from the message queue created by the operating system, and placed in the application-created message queue, so that a sequential execution order of the messages may be adjusted, not uniformly abiding by the principle of first arriving first processed as specified in the operating system. As such, the messages in the message queues may be processed more flexibly. For example, some real-time external events may be processed in a timely manner, and if there occurs a situation some messages that arrive later must be processed before some other messages that arrive earlier to achieve a predetermined effect, the messages that arrive later may be adjusted to before the messages that arrive earlier to achieve the predetermined effect, and so on.

Figure 3:
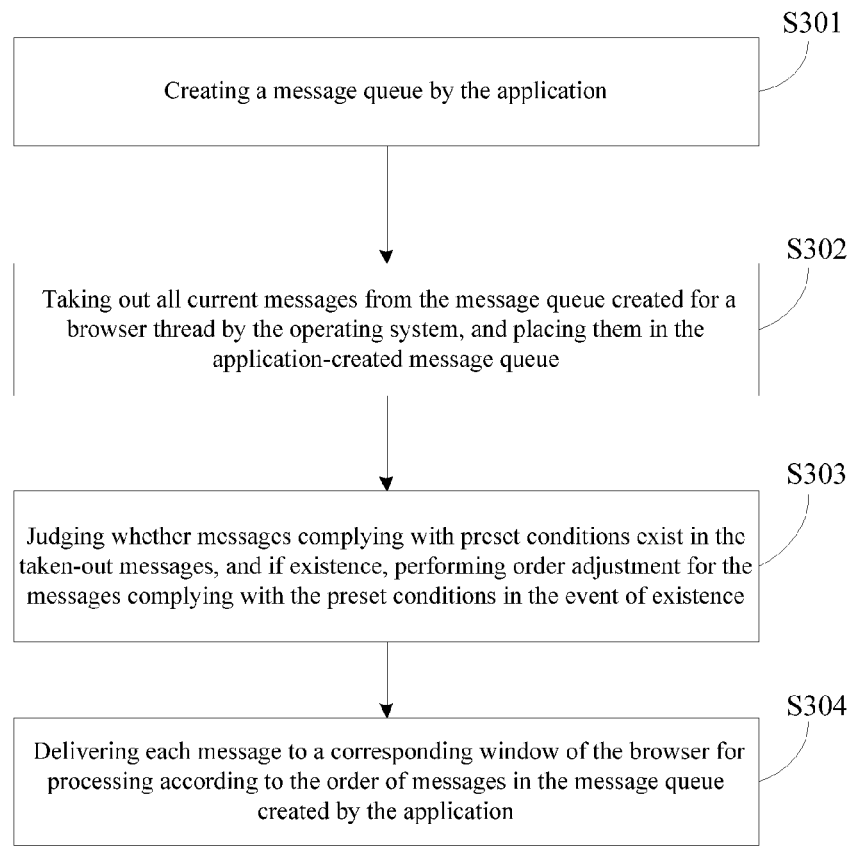
FIG. 3 illustrates a flow chart of a browser message processing method according to an embodiment of the present invention.

Referring to FIG. 3, an embodiment of the present invention provides a browser message processing method which may be applied to one application (the application may be an application developed for performing the message processing function, or result from adding the message processing function on the basis of already-existing browsers, and so on). Upon specific implementation, the method may comprise the following steps:

S301: creating a message queue by the application;

The message queue is created by the application itself. Hence, the application can decide, on its own, an arranging order of the messages in the queue, or adjust the order on its own.

S302: taking out all current messages from the message queue created by the operating system for a browser thread, and placing them in the application-created message queue;

To better understand this step, the message processing procedure in the operating system is introduced briefly. Generally, a message (an externally-inputted message is taken as an example) undergoes the following procedure from generation to final processing: (1) when a mouse or keyboard acts, a device drive converts an input operation into a message and places it in a system message queue; (2) when the operating system moves a message out of the system message queue every time, it judges which target window the message belongs to, and then delivers it to a message queue of a thread creating the target window, i.e., the message queue of the thread receives all mouse and keyboard messages for the window created by it; (3) the thread moves messages out of its message queue and guides the system to deliver these messages to a correct window for processing. As can be seen from the above, the operating system may create two kinds of message queues: one is the system message queue into which all messages are placed first; the other is the message queue of the thread into which all messages to be processed by the window created by a certain thread are placed.

Correspondingly, as far as a browser application running in the operating system, the operating system also creates a message queue for the thread of the browser. When a message taken out from the system message queue belongs to a certain thread of the browser, it will be placed in the message queue of the thread. The embodiment of the present invention involves taking out the thread already delivered to the message queue of the browser thread, and placing it in the message queue created by the application itself.

It needs to be noted that, the messages in the message queue of the browser thread might comprise, besides the aforesaid externally-inputted messages (namely, messages generated by the mouse, keyboard or the like), system messages (namely, messages generated by the operating system) and messages generated by the browser itself, for example, a certain operation might not be processed immediately, whereupon the processing may be postponed by generating a message, i.e., the message is placed in the message queue for queuing up to thereby postpone the processing time of the message; or some operations might need to be executed in a trans-thread manner, whereupon they may be placed in the message queue first, and then delivered to the corresponding thread message queue, and so on. In the embodiment of the present invention, when the current messages are taken out from the message queue of the browser thread, the messages may comprise all of the aforesaid kinds of messages, namely, all messages, no matter whether the externally-inputted messages or messages of the operating system or messages of the browser itself may be taken out and placed in the message queue created by the application on his own to facilitate adjustment of the order of messages. Of course, the adjustment of the execution orders of some system messages might not be permitted, whereupon order adjustment may not be performed for such system messages.

In addition, it needs to be noted that, the messages may be taken out from the browser thread in a manner of employing API (Application Programming Interface) functions provided by the operating system. For example, the API function PeekMessage may be directly used.

Of course, to avoid occurrence of errors during program running, after the current messages are taken out from the operating system-created message queue, the taken-out messages may be deleted from the operating system-created message queue.

S303: judging whether messages complying with preset conditions exist in the taken-out messages, and if existence, performing order adjustment for the messages complying with the preset conditions in the event of existence.

A basis for adjusting the messages may be specifically determined according to needs in practical application, for example, it may be believed that some messages generated by operations related to user interaction need to be priority-processed, whereupon such messages may be placed at a relatively forward position in the message queue. Again for example, suppose that the user is viewing a video, an operation related to the video might need to be priority-processed, whereupon the message corresponding to such operation may be placed at a relatively forward position in the message queue. Again for example, if the user performs other operations while viewing the video, it may be believed that the message corresponding to such an operation of the user needs to jump the queue and be processed in advance. Additionally, it may be judged whether the messages need to be processed by the window currently at a focal point, and, if yes, the order of the messages may be brought forward. Again, a message (particularly the message generated by the browser itself) might need to be executed before another message, whereupon the message may be adjusted before the another message, and so on.

It needs to be noted that, the operating system numbers each message, each message has its own ID, the message may include information such as window handle and message type, these information may be acquired through the API function of the system (for example, whether there is keyboard or mouse information is in the thread message queue may be checked through GetInputState, and a certain type of message in the message queue may be checked through GetQueueStatus), the window for processing each message and the operation corresponding to the message can be known from these information, and thereby the order of each message in the message queue can be determined according to preset rules. For example, if it is found that the operation corresponding to a certain message taken out needs to be processed by a certain video play window and a priority level preset for such type of message is relatively high, the message may be placed at a relatively forward position in the message queue, even at the first position.

S304: delivering each message to a corresponding window of the browser for processing according to the order of messages in the message queue created by the application.

Since each message has already been re-adjusted in the message queue created by the application on its own, delivery-processing may be performed for each message according to the order after adjustment. Specifically, if the message is taken out from the message queue of the browser thread in step S302, upon delivering, the message may be directly delivered to the corresponding window which processes the message. That is to say, after the messages in the system queue are delivered by the operating system to a browser thread message queue, it is not the thread itself that delivers the messages to a specific window, but an application having the message processing function as stated in the embodiment of the present invention, in place of the specific thread, that completes the delivery. Upon specific implementation, the application having the message processing function, in place of the specific thread, may complete the message delivery operation by using API functions provided by the operating system (an API function may be DispatchMessage).

In one word, by using the message processing method provided by the embodiment of the present invention, the application may create the message queue on its own, and current messages may be taken out from the message queue created by the operating system for the browser thread, and placed in the self-created message queue, so that a sequential execution order of the messages may be adjusted, not uniformly abiding by the principle of first arriving first processed as specified in the operating system. As such, messages in the message queue may be processed more flexibly. For example, some real-time external events may be processed in a timely manner, and if there occurs a situation some messages that arrive later must be processed before some other messages that arrive earlier to achieve a predetermined effect, the messages that arrive later may be adjusted to before the messages that arrive earlier to achieve the predetermined effect.

Figure 4:
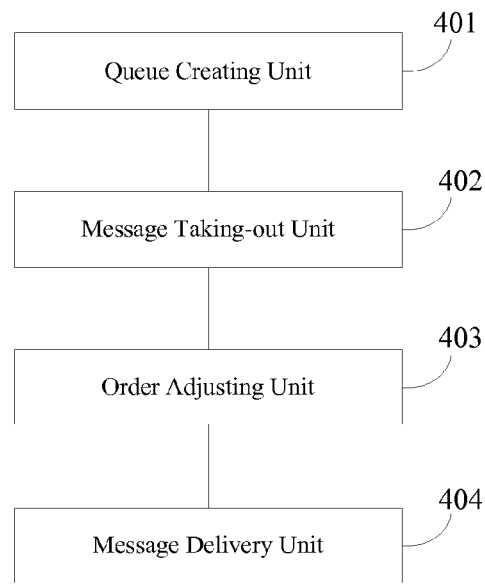
FIG. 4 illustrates a schematic view of a browser message processing device according to an embodiment of the present invention.

Corresponding to the message processing method provided by the embodiment of the present invention, embodiments of the present invention further provide a browser message processing device, which is also applied to an application. Referring to FIG. 4, the device comprises the following units:

a queue creating unit 401 configured to create a message queue by the application;

a message taking-out unit 402 configured to take out all current messages from the message queue created by the operating system for the browser thread, and place them in the message queue created by the application;

an order adjusting unit 403 configured to judge whether messages complying with preset conditions exist in the taken-out messages, and if existence, perform order adjustment for the messages complying with the preset conditions.

a message delivery unit 404 configured to deliver each message to a corresponding window of the browser for processing according to the order of messages in the message queue created by the application Of course, to avoid occurrence of errors during program running, after the current messages are taken out from the operating system-created message queue, the taken-out messages may be deleted from the operating system-created message queue. Upon specific implementation, the device may further comprise:

a deleting unit configured to, after all current messages are taken out from the operating system-created message queue for the browser thread, delete the taken-out messages from the operating system-created message queue.

Therein Upon specific implementation, the order adjusting unit 403 may specifically comprise:

a first adjusting subunit configured to judge whether messages needing to be processed by the window currently at the focal point exist in the taken-out messages, and if existence, adjust the messages to a front end of the message queue.

Or the order adjusting unit 403 may further specifically comprise:

A second adjusting subunit configured to judge whether messages related to the user interaction exist in the taken-out messages, and if existence, adjust the messages to a front end of the message queue.

Again the order adjusting unit 403 may further specifically comprise:

A third adjusting subunit configured to judge whether a second message needing to be processed before the first message exists in the taken-out messages, and if existence, adjust the second message to the first message.

By using the browser message processing device provided by the embodiment of the present invention, the application may create the message queue on its own, and current messages may be taken out from the message queue created by the operating system for the browser thread, and placed in the self-created message queue, so that a sequential execution order of the messages may be adjusted, not uniformly abiding by the principle of first arriving first processed as specified in the operating system. As such, the messages in the message queue may be processed more flexibly. For example, some real-time external events may be processed in a timely manner, and if there occurs a situation some messages that arrive later must be processed before some other messages that arrive earlier to achieve a predetermined effect, the messages that arrive later may be adjusted to before the messages that arrive earlier to achieve the predetermined effect.

Embodiments regarding parts in the present invention may be implemented in hardware, or implemented by one or more software modules running on a processor, or implemented in their combinations. Those skilled in the art should understand that a microprocessor or digital signal processor (DSP) may be used in practice to implement some or all functions of some or all parts of the device according to embodiments of the present invention. The present invention may also be implemented as an apparatus or device program (e.g., computer program and computer program product) for executing part or all methods described here. Such programs implementing the present invention may be stored in a computer-readable medium, or may be in a form having one or more signals. Such signals can be obtained by downloading from an Internet website, or provided on a carrier signal or provided in any other forms.

Figure 5:
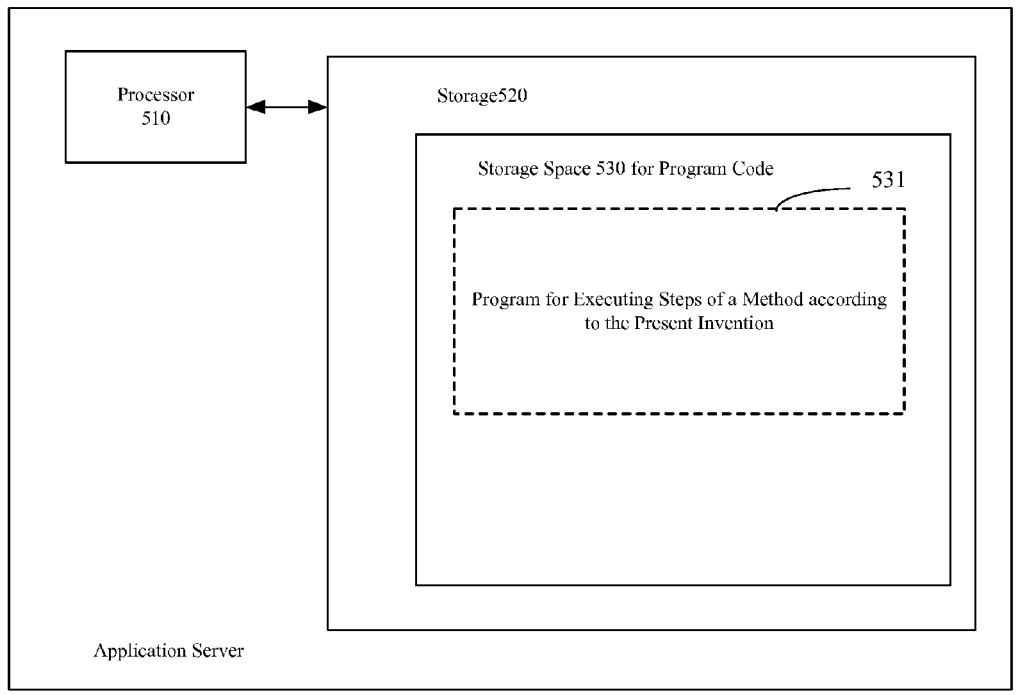
FIG. 5 illustrates a block diagram of a server for executing the method according to the present invention.
Figure 6:
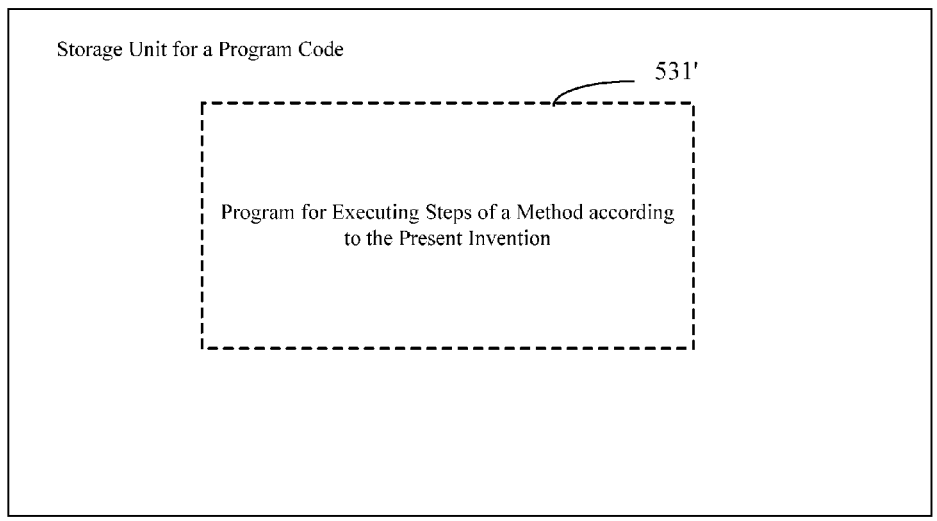
FIG. 6 illustrates a memory unit for maintaining or carrying a program code for implementing the method according to the present invention.

For example, FIG. 5 illustrates a server, for example, an application server, which can implement the method according to the present invention. The server conventionally comprises a processor 510 and a computer program product or computer-readable medium in the form of storage 520. The storage 520 may be an electronic storage such as flash memory, EEPROM (Electrically Erasable Programmable Read-Only Memory), EPROM, hard disk or ROM. The storage 520 has a storage space 530 for a program code 531 for executing any step of the above methods. For example, the storage space 530 for program code may comprise program codes 531 respectively for implementing steps of the above method. These program codes may be read from or written into one or more computer program products. These computer program products comprise a program code carrier such as hard disk, compact disk (CD), memory card or floppy disk. Such computer program products are usually portable or fixed storage unit as shown in FIG. 6. The storage unit may have a storage segment, a storage space or the like arranged in a similar way to the storage 520 in the server of FIG. 5. The program code may for example be compressed in a suitable form. Usually, the storage unit comprises a computer-readable code 531', namely, a code readable by a processor for example similar to 510. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It needs to be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it needs to be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A message processing method, comprising:
   creating a message queue by an application;
   taking out all current messages from a message queue created by an operating system;
   performing order adjustment for the taken-out messages and placing them in the message queue created by the application; and
   performing delivery-processing for each message according to an order of messages in the message queue created by the application.

2. The method according to claim 1, wherein after taking out all current messages from the message queue created by the operating system, the method further comprises:
   deleting the taken-out messages from the message queue created by the operating system.

3. The method according to claim 1, wherein the taking out all current messages from the message queue created by the operating system comprises:
   taking out all current messages from a message queue created by the operating system for a designated thread; and
   the performing delivery-processing for each message comprises:
   delivering messages to their respectively corresponding window so that each message is processed by its corresponding window.

4. The method according to claim 3, wherein the designated thread is a thread related to an interface.

5. The method according to claim 1, wherein the taking out all current messages from the message queue created by the operating system comprises:
   taking out all current messages from a system message queue created by the operating system; and
   the performing delivery-processing for each message comprises:
   delivering each message to a message queue created by the operating system for a corresponding thread so that the corresponding thread delivers each message to a corresponding window for processing.

6. A message processing device, comprising:
   at least one processor to execute a plurality of units comprising:
   a queue creating unit to create a message queue by an application;
   a message taking-out unit to take out all current messages from a message queue created by an operating system and delete the taken-out messages from the message queue created by the operating system;
   an order adjusting unit to perform order adjustment for the taken-out messages and place them in the message queue created by the application; and
   a message delivery unit to perform delivery-processing for each message according to an order of messages in the message queue created by the application.

7. The device according to claim 6, further comprising:
   a deleting unit to, after all current messages are taken out from the message queue created by the operating system, delete the taken-out messages from the message queue created by the operating system.

8. The device according to claim 6, wherein the message taking-out unit comprises:
   a first taking-out subunit to take out all current messages from the message queue created by the operating system for a designated thread; and
   the message delivery unit comprises:
   a first delivery subunit to deliver each message to a corresponding window so that the corresponding window processes each message.

9. The device according to claim 8, wherein the designated thread is a thread related to an interface.

10. The device according to claim 6, wherein the message taking-out unit comprises:
    a second taking-out subunit to take out all current messages from a system message queue created by the operating system; and
    the message delivery unit comprises:
    a second delivery subunit to deliver all messages to the message queue created by the operating system for a corresponding thread so that the corresponding thread delivers each message to a corresponding window for processing.

11. A browser message processing method, comprising:
    creating a message queue by an application;

taking out all current messages from a message queue created by an operating system for a browser thread, and placing them in the message queue created by the application;

judging whether messages complying with preset conditions exist in the taken-out messages, and performing order adjustment for the messages complying with the preset conditions; and delivering each message to a corresponding window of the browser for processing according to an order of messages in the message queue created by the application.

12. The method according to claim 11, further comprising:

after taking out all current messages from the message queue created by the operating system for the browser thread, deleting the taken-out messages from the message queue created by the operating system.

13. The method according to claim 11, wherein the judging whether messages complying with preset conditions exist in the taken-out messages, and performing order adjustment for the messages complying with the preset conditions comprises:

judging whether messages needing to be processed by a window currently at a focal point exist in the taken-out messages, and adjusting the messages to a front end of the message queue.

14. The method according to claim 11, wherein the judging whether messages complying with preset conditions exist in the taken-out messages, and performing order adjustment for the messages complying with the preset conditions comprises:

judging whether messages related to user interaction exist in the taken-out messages, and adjusting the messages to a front end of the message queue.

15. The method according to claim 11, wherein the judging whether messages complying with preset conditions exist in the taken-out messages, and performing order adjustment for the messages complying with the preset conditions comprises:

judging whether a second message needing to be processed before the first message exists in the taken-out messages, and adjusting the second message to before the first message.

* * * * *